(12) United States Patent
Sawatzki et al.

(10) Patent No.: US 6,190,724 B1
(45) Date of Patent: Feb. 20, 2001

(54) INFANT FORMULA

(75) Inventors: Günther Sawatzki, Münzenberg; Günther Böhm, Echzell; Gilda Georgi; Friedrich Schweikhardt, both of Friedrichsdorf, all of (DE)

(73) Assignee: N.V. Nutricia, Zoetermeer (NL)

(*) Notice: Under 35 U.S.C. 154(b), the term of this patent shall be extended for 0 days.

(21) Appl. No.: 09/401,611

(22) Filed: Sep. 22, 1999

Related U.S. Application Data

(63) Continuation of application No. 09/000,233, filed as application No. PCT/EP96/03515 on Aug. 8, 1996, now abandoned.

(30) Foreign Application Priority Data

Aug. 8, 1995 (DE) ............................................. 195 29 149
Sep. 29, 1995 (DE) ............................................. 195 36 417

(51) Int. Cl.⁷ ............................... A23L 1/305; A23J 3/08
(52) U.S. Cl. ........................... 426/656; 426/580; 426/801
(58) Field of Search .................................... 530/402, 350, 530/300; 426/580, 587, 656, 657, 801, 583, 330, 330.2, 334; 514/2, 21

(56) References Cited

U.S. PATENT DOCUMENTS 5,143,737 * 9/1992 Richardson ............................... 426/2
5,169,666 * 12/1992 Woychik ............................... 426/580

OTHER PUBLICATIONS

Ivanova et al. "Non–Enzymic Glycosylation of Feed Proteins . . . ", Voprosy Pitaniya (No. 2), p. 32–34, (Abstract), 1992.*

Monahan et al., "Polymerization of Whey Proteins in Whey", J. Agric. & Food Chem., 41(11): 1826–1829, 1993.*

Sakamoto et al. J. Food Science 60(2): 416–419, 1995.*

Ikura et al. Agric. & Biol. Chemistry, 44(12): 2979–2984, 1980.*

* cited by examiner

Primary Examiner—K. Hendricks
(74) Attorney, Agent, or Firm—Bacon & Thomas

(57) ABSTRACT

A protein composition and a baby food (infant formula) containing this are provided. The protein composition is characterised in that it contains at least 15 wt % (based on the total amount of the proteins) modified proteins, the course of whose digestion is slowed compared to the unmodified, normal proteins serving as starting materials. Such a protein composition and a baby food containing this create just as good metabolic conditions for the normal development of a child as feeding with human milk proteins.

10 Claims, No Drawings

INFANT FORMULA

This application is a continuation of U.S. patent application Ser. No. 09/000,233 filed Feb. 5, 1998, now abandoned, which is a national stage application of PCT/EP96/03515, filed Aug. 08, 1996.

The invention concerns a protein composition, an baby food or infant formula, respectively, containing this protein composition and the use of this protein composition for the production of baby foods or infant formulas, respectively.

For the production of baby foods, in particular milk baby foods or infant milk formulas, respectively, inter alia cow's milk or components from cow's milk are used. These include for example cow's milk proteins (caseins and whey proteins). Now cow's milk proteins differ considerably from those of human milk. One of the fundamental differences is the ratio of caseins and whey proteins. Thus cow's milk has a whey protein/casein ratio of ca. 20:80, while in human milk this ratio is about 60:40 (50:50). Moreover, not only is there a difference in the whey protein/casein ratio, but also the individual whey proteins and caseins differ from one another. Thus for example human milk contains no β-lactoglobulin and also no α-casein. However in cow's milk these proteins make up ca. 50% of the total protein. In contrast to this, human milk protein contains ca. 25% of so-called immunological proteins, such as lactoferrin and secretory immunoglobulin A (sigA). Further differences between human and bovine proteins, even when they are identical in name, consist in the amino acid composition, in the 3-dimensional structure and in the chemical composition. Thus for example human κ-casein contains about 40% carbohydrates and bovine κ-casein only about 10%. These are only a few of the differences between cow's milk proteins and human milk proteins; many others could also be cited.

These differences have the effect that the amino acid uptake from the gastrointestinal tract of babies from human milk proteins is different to that from the proteins of standard commercial infant formulas, which are also described as formula foods. Such formula foods are "artificially" produced. In other words, the attempt is made to imitate maternal milk as "exactly" as possible, starting from animal and/or plant starting materials, these being in particular proteins, fats and carbohydrates.

The qualitative differences between proteins in formula foods and human milk proteins i.e. mother's milk proteins overall result in a different course of digestion. Thus for example the residence time of the human milk proteins in the stomach is shorter than that of the proteins from formula foods. On the other hand, the enzymatic breakdown of the human milk proteins in the small intestine takes place considerably more slowly than that of the proteins from formula foods. As a result, the supply of proteins, peptides and amino acids in the different sections of the gastrointestinal tract during digestion of proteins from formula foods does not correspond to the supply during the digestion of human milk proteins. This specific supply for the individual sections of the gastrointestinal tract is an important signal for the morphological and functional development of the intestinal section concerned. If the processes of the digestion of proteins from formula foods and mother's milk proteins are not matched, there is different development of important intestinal functions. These differences can persist into adulthood, and create the basis for increased susceptibility to gastrointestinal diseases.

It has now been found that during a cycle from one meal to the next the uptake of amino acids from proteins from formula foods corresponds to the amino acid uptake from a food with the same amount of human milk proteins at practically no time in the amino acid uptake cycle. The amount and mutual ratio of the individual amino acids taken up affect not only the amino acid supply to the tissues (and hence the tissue-specific protein synthesis) but also, as signals for the secretion of hormones and enterohormones, play an important part in the regulation of the postprandial metabolism. The morphological development of the brain, the morphological maturation and functional determination of the gastrointestinal tract and also the differentiation of the metabolism are completed in the initial months of life. Hence the regulation processes triggered by the food during this time are of great significance for subsequent development. Because of the chronological determination of the development phases, this applies particularly for the brain.

The purpose of the present invention is to provide protein mixtures for an infant formula (baby food) or formula food which creates just as good metabolic conditions for the normal development of the child as feeding with mother's milk proteins i.e. human milk proteins.

This purpose is accomplished through the teaching of the claims.

In the protein composition and formula food (i.e. baby food) according to the invention, normal proteins, which are already at present used for the production of formula foods, are mixed with proteins modified in the following way, so that the chronological course of the digestion in the different sections of the gastrointestinal tract is essentially matched qualitatively and quantitatively to the conditions during the digestion of mother's milk proteins. In other words, in the production of the protein compositions and formula foods according to the invention, modified and unmodified proteins are mixed in such a way that the digestion of the protein mixture essentially corresponds both in chronological course and also in quantity and quality to that of mother's milk proteins.

As raw materials and thus as proteins for the baby foods according to the invention, all previously known protein sources, for example proteins, oligopeptides, dipeptides and/or free amino acids, which can also be present in the form of their salts, hydrochlorides, etc., can be used. Thus, bovine caseins, whey proteins and individual proteins thereof (α-casein, β-casein, κ-casein, α-lactalbumin, β-lactoglobulin, serum albumin, lactoferrin, immunoglobulins) and combinations of these proteins and also mixtures with other proteins, such as for example soya proteins, can be used. Other proteins of animal or plant origin, which are suitable for human nutrition, can also be used. These proteins are normal proteins, which in the present documents are described as modified proteins.

Now according to the invention, as well as the normal, unmodified proteins, modified proteins are also present. Such modified proteins are obtained by modification of such normal proteins by known methods, as a result of which the process of the digestion of these modified proteins is slowed.

In other words, the kinetics of the digestion are altered, so that the digestion takes place more slowly.

As normal proteins or starting proteins which can be modified according to the invention, the following can be used: bovine caseins, whey proteins and individual proteins thereof (α-casein, β-casein, κ-casein, α-lactalbumin, β-lactoglobulin, serum albumin, lactoferrin, immunoglobulins), specific combinations of these proteins and also mixtures with other proteins, such as for example soya proteins. Other proteins of animal or plant origin, which are suitable for human nutrition, are also possible.

The modification of such proteins can be performed by the following methods:

1) Polymerisation and/or crosslinking of the proteins by means of enzymes such as transglutaminases (Matheis, G., Whitaker, J. R.; A Review: Enzymatic cross-linking of proteins applicable to foods; J Food Biochemistry 11, 309–327, 1987 or Ikura, K., Sasaki, R., Motoki, M.; Use of transglutaminase in quality improvement and processing of food proteins. Comments Agric. & Food Chemistry 2 (6), 389–407 (1992).).

2) Introduction of defined amino acids (i.e. those amino acids, in particular proline, and amino acid sequences, in particular proline-containing, which slow the digestive process) into the protein chain by genetic engineering processes (WO 9502692-A1 & WO 9428126-A2) or with the help of the so-called plastein reaction (Lorenzen, C. P., Schlimme, E.; Experimental studies on the comparison of enzyme-induced protein aggregation (EIPA) and the plastein reaction in sodium-caseinate proteolysates. Kieler Milchwirtschaftliche Forschungsberichte 43, 45–51, 1991 or Sukan, G., Andrews, A. T.; Application of the plastein reaction to casein and to skim-milk powder, I and I; J. Dairy Res. 49, 265–293, 1982).

3) Glycosylation, i.e. by chemical or enzymatic (glycosidases) attachment of sugar chains (oligosaccharides) of various length or composition to the proteins (Mencke, A.J., Cheung, D. T., World, F.; Attachment of oligosaccharide-asparagine derivatives to proteins; activation of asparagine with ninhydrin and coupling to protein by reductive amination; Methods in Enzymology, 138, 409–413, 1987 or Yan, S. B.; Covalent attachment of oligosaccharide-asparagine derivatives: Incorporation into glutamine residues with the enzyme transglutaminase; Methods in Enzymology, 138, 413–418, 1987).

4) Dephosphoryiation of proteins by means of phosphatases (Bingham, E., Farrell, H. M., Dahl, K. J.; Removal of phosphate groups from casein with potato acid phosphatase; Biochim. Biophys. Acta, 429, 448–460, 1976 or Yamauchi, K., Yoneda, Y.: Effect of dephosphorylation of casein on its coagulation and proteolysis by chymosin; Agric. Biol. Chem. 42, 1031–1035,1978).

5) Partial or total thermal rearrangement of the proteins (Jost, R.; Functional characteristics of dairy proteins; Trends in Food Science & Technology, 4, 283–288, 1993).

For the production of the protein compositions according to the invention, unmodified and modified proteins are mixed so that at least 15 wt % of the protein composition or protein mixture are modified proteins. For the production of baby foods or baby milks, such a protein composition is then supplemented with the other normal components for the production of such baby foods or baby milks, such as fats and carbohydrates and also as necessary and as desired vitamins and mineral substances. For the production of the baby foods or baby milks the normal industrial processes can be used.

Below, some mixing ratios of various modified and unmodified proteins are quoted: these mixtures represent protein compositions or protein mixtures according to the invention:

1) 40% caseinate (at least 30% dephosphorylated); 60% whey proteins, unmodified.

2) $\geq$20% caseinate (at least 60% dephosphorylated); $\leq$30% unmodified casein, $\geq$15% polymerised (crosslinked) whey proteins, $\leq$35% unmodified whey proteins.

3) 50% unmodified caseinate, $\geq$15% glycosylated whey proteins, $\leq$ 35% unmodified whey proteins.

4) 20% unmodified caseinate, 20% crosslinked caseinate, $\leq$15% thermally modified whey proteins, $\leq$45% unmodified whey proteins.

Moreover, it was hitherto assumed that for the nutrition of a child with formula foods it is advantageous to make the available plant and/or animal proteins ever more rapidly digestible. According to the invention, it has now surprisingly been found that the course of digestion of the protein in standard commercial baby foods is significantly faster than that of the human milk proteins, which leads to the above-described significant differences between human milk proteins and the proteins of standard commercial formula foods as regards digestion. According to the invention therefore it is necessary to slow the course of digestion of the protein mixtures from plant and/or animal proteins for formula foods in contrast to standard commercial protein mixtures by the modification(s) described here, for example by polymerisation and crosslinking and/or by introduction of certain amino acids, for example proline, into the protein chain. Protein mixtures modified in this way can then be digested more slowly and thus more comparably to the human milk proteins.

The plasma amino acid levels of children are utilised for assessment of the modifications made to the proteins. The modification of the proteins can be measured in terms of the postprandial amino acids of the essential and non-essential amino acids 15, 30, 45 and 60 mins after administration of formula foods which contain these modified proteins. The plasma concentration of the sum of the essential or the nonessential amino acids (in other words: the total amount of these amino acids per unit volume or unit weight in the blood) must not change by more than the factor 1.5 over a period from 15 to 60 mins. In other and words, the values lying in this time interval must not differ from each other by more than the factor 1.5. Apart from this, the plasma concentration of the sum of the essential plasma amino acids or the plasma concentration of the non-essential plasma amino acids respectively must not differ by more than a maximum of ±20% or not more than a maximum of ±50% from the plasma concentration of the sum of the essential or non-essential plasma amino acids after administration of human milk, 15 to 60 mins and ca. 90 and ca. 180 min after ingestion of the food. Based on the individual amino acids, the modification of the proteins can be measured by the corresponding concentration rises and falls whose course at 15, 30, 45 and 60 mins are comparable with those after administration of human milk.

In order to be able to determine the plasma amino acid concentrations, the following analytical methods can be used:

Georgi, G., Pietsch, C., Sawatzki, G.; High-performance liquid chromatographic determination of amino acids in protein hydrolysates and in plasma using automated pre-column derivatisation with ophthaldialdehyde/2-mercaptoethanol. J. Chromat. 613, 35–42, 1993.

The analysis of the plasma concentration of amino acids can be performed on one child. However it is advisable to use groups, in order to obtain more reliable data.

As well as the protein composition described, the baby food according to the invention also contains other essential and desired components for the nutrition of a child, for example fats, mineral substances, vitamins, carbohydrates, etc. These further components are of the normal kind and hence well-known, so that they require no further explanation. The protein composition according to the invention is advantageously used in the baby foods according to the invention in the same amount as the previously known protein compositions.

The action or effect of the protein compositions or baby food according to the invention is determined by measurement of the time-dependent amino acid concentrations in the plasma before and after a meal with a protein composition/baby food according to the invention. In addition to this, the gastric residence time, intestinal passage time and the course of digestion can be measured with the aid of enzymes (pepsin, pancreatin, trypsin, chymo-trypsin, carboxypeptidases, aminopeptidases), the synthesis of important marker proteins or the total protein synthesis rate.

Through the baby food and protein composition according to the invention, metabolic conditions for the normal development of the child as well as with human milk proteins are created. This relates above all to the morphological and functional development of the gastrointestinal tract (including liver and pancreas), the amino acid supply for the synthesis of endogenous proteins in all tissues (especially important to the development of the nerve tissue) and the hormonal signals of a meal. In this way, not only is a balanced metabolic situation achieved, but also a balanced mutual ratio of individual metabolic paths for later phases of life is "programmed".

Below, the invention is illustrated in more detail by means of several, referred embodiments.

EXAMPLE 1:

Adapted Milk Baby Food as Spray-Dried Product
(Batch Size 100 kg)

172.2 kg cream (with 10.2% milk fat and 11.72 kg skim milk dry substance) are placed in a heatable tank with stirrer and warmed to 70° C. With vigorous stirring, 30.4 kg demineralised, deglycosylated whey powder (13.5% protein), 26.96 kg lactose, 0.025 kg taurine, 0.3 kg potassium chloride (previously dissolved in 10 l water at 600 C.), 0.4 kg calcium carbonate and 0.5 kg mineral substance mixture are successively added and completely dissolved. 0.5 kg emulsifier are dissolved in 11.2 kg hot plant fat mixture (50–600 C.) and added to the batch. After this, the vitamin mixture (0.5 kg) is stirred in. The finished batch is heated to 70–75° C. and homogenised at 180 bar. The concentrate is then heated to 95° C. by a heater, cooled to 70° C. and spray-dried.

EXAMPLE 2:

Adapted Milk Baby Food as Spray-Dried Product
(Batch Size 100 kg)

Ca. 160 l water are heated to 70° C. in a heatable vessel with a powerful stirrer. With vigorous stirring, 3.7 kg dephosphorylated casein (89% protein), 1.0 kg whey protein hydrolysate (79% protein), 30.4 kg demineralised whey powder (13.5% protein), 26.9 kg lactose, 0.025 kg taurine, 0.3 kg potassium chloride (previously dissolved in 10 l water at 60° C.), 0.4 kg calcium carbonate and 0.5 kg mineral substance mixture are successively added and completely dissolved. 0.5 kg emulsifier are dissolved in 11.2 kg hot plant fat mixture (50–60° C.) and added to the batch. After this, the vitamin mixture (0.5 kg) is stirred in. The finished batch is heated to 70–75° C. and homogenised at 180 bar. The concentrate is then heated to 95° C. by a heater, cooled to 70° C. and spray-dried.

EXAMPLE 3:

Adapted Milk Baby Food as Spray-Dried Product
(Batch Size 100 kg)

The following are successively dissolved in 100 l hot water (ca. 70–75° C.) with vigorous stirring: 36.8 kg lactose, 14.8 kg maltodextrin, 3.0 kg starch, 7.8 kg whey protein conc-entrate thermally rearranged by modification method 5) described above, 6.5 kg casein, 0.09 kg reduced glutathione, 0.6 kg potassium chloride (previously dissolved in ca. 5 l warm water at 60° C.), 0.27 kg tripotassium citrate (previously dissolved in ca. 5 l water at 60° C.), 0.19 kg citric acid (previously dissolved in ca. 3 l hot water at 60° C.) and 1.4 kg mineral substance mixture. 2 kg emulsifier are completely dissolved in hot (50–60° C.) molten fat (626.3 kg) and the mixture is added to the batch. After this, the vitamin mixture (0.31 kg) is added and completely dissolved. The batch is heated to 70–75° C. and homogenised at 180–200 bar. The concentrate is then heated to 95° C. in a heater, and then spray-dried.

What is claimed is:

1. An infant milk formula which contains a protein composition wherein said protein composition comprises modified proteins in an amount of at least 15-weight % based upon the total weight of proteins in the composition, wherein said modified proteins are obtained by modifying starting proteins selected from the group consisting of bovine proteins, whey proteins, individual proteins of whey proteins, soya proteins or mixtures of one or more of said starting proteins, said modified proteins being modified by polymerization of the starting proteins, by crosslinking the starting proteins or by attachment of sugar chains to the protein chain of the starting proteins in such a way that the digestion of the modified proteins by an infant is slowed down relative to the starting proteins from which they are obtained.

2. The infant milk formula according to claim 1, wherein said modified proteins are obtained by polymerization of the starting proteins.

3. The infant milk formula according to claim 1, wherein said modified proteins are obtained by crosslinking said starting proteins.

4. The infant milk formula according to claim 9, wherein said modified proteins are obtained by attachment of sugar chains to the protein chain of said starting proteins.

5. The infant milk formula according to claim 1, wherein said modified proteins are present in such proportions that in an infant fed with said formula the total quantity of essential amino acids per unit volume of blood varies by not more than the factor 1.5 over a period from 15 to 60 minutes after ingestion of the formula; and from 15 to 60 minutes and subsequently also at 90 and at 180 minutes after ingestion of the formula, the total quantity of essential amino acids per unit volume of blood does not differ more than ±20% from the total quantity of essential amino acids of an infant fed with a quantity of human milk containing the same quantity of proteins.

6. The infant milk formula according to claim 3, wherein such modified proteins are present in such proportions that in an infant fed with said formula the total quantity of nonessential amino acids per unit volume of blood varies by not more than the factor 1.5 over a period from 15 to 60 minutes after ingestion of the formula: and after ingestion of the formula the total quantity of nonessential amino acids per unit volume of blood does not differ more than ±50% from the total quantity of nonessential amino acids of an infant fed with a quantity of human milk containing the same quantity of proteins.

7. A method of slowing down the digestion of an infant milk formula which contains a protein composition; said method comprising incorporating into the protein composition at least 15%, by weight, of modified proteins derived from starting proteins selected from the group consisting of bovine proteins, whey proteins, individual proteins of whey proteins, soya proteins or mixtures of these starting proteins, said modified proteins being modified by polymerization of the starting proteins, by crosslinking the starting proteins or by attachment of sugar chains to the protein chain of the starting proteins in such a way that the digestion of the modified proteins by an infant is slowed down relative to the digestion of the starting proteins from which they are derived; and feeding said infant milk formula to said infant.

8. The method according to claim 7, wherein said modified proteins are derived by polymerization of the starting proteins.

9. The method according to claim 7, wherein said modified proteins are derived by crosslinking said starting proteins.

10. The method according to claim 7,wherein said modified proteins are derived by attachment of sugar chains to the protein chain of said starting proteins.

\* \* \* \* \*

UNITED STATES PATENT AND TRADEMARK OFFICE
CERTIFICATE OF CORRECTION

PATENT NO. : 6,190,724 B1
DATED : February 20, 2001
INVENTOR(S) : Sawatzki et al.

It is certified that error appears in the above-identified patent and that said Letters Patent is hereby corrected as shown below:

Column 5,
Line 60, the term "deglycosylated" should read -- glycosylated --.

Signed and Sealed this

Fifth Day of March, 2002

Attest:

JAMES E. ROGAN
Attesting Officer  Director of the United States Patent and Trademark Office